United States Patent
Ausserlechner

(10) Patent No.: US 10,989,516 B2
(45) Date of Patent: Apr. 27, 2021

(54) MAGNETIC ANGLE SENSOR ARRANGEMENT AND METHOD FOR ESTIMATING A ROTATION ANGLE

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 97 days.

(21) Appl. No.: 16/203,865

(22) Filed: Nov. 29, 2018

(65) Prior Publication Data
US 2019/0170497 A1 Jun. 6, 2019

(30) Foreign Application Priority Data
Dec. 5, 2017 (DE) .......................... 102017128869.4

(51) Int. Cl.
| | |
|---|---|
| *G01D 5/14* | (2006.01) |
| *G01B 7/30* | (2006.01) |
| *G01D 5/245* | (2006.01) |

(52) U.S. Cl.
CPC .............. *G01B 7/30* (2013.01); *G01D 5/145* (2013.01); *G01D 5/2451* (2013.01); *G01D 5/2454* (2013.01)

(58) Field of Classification Search
CPC .... G01D 5/145; G01D 5/2454; G01D 5/2451; G01B 7/30

(Continued)

(56) References Cited

U.S. PATENT DOCUMENTS

| | | | |
|---|---|---|---|
| 5,019,776 A | 5/1991 | Kawamata et al. | |
| 5,523,679 A * | 6/1996 | Kalb ...................... | G01D 5/145 |
| | | | 324/124 |

(Continued)

FOREIGN PATENT DOCUMENTS

| | | |
|---|---|---|
| CN | 1347493 A | 5/2002 |
| CN | 202855522 U | 4/2013 |

(Continued)

*Primary Examiner* — Patrick Assouad
*Assistant Examiner* — Demetrius R Pretlow
(74) *Attorney, Agent, or Firm* — Harrity & Harrity, LLP

(57) ABSTRACT

The present disclosure relates to a magnetic angle sensor arrangement. The magnetic angle sensor arrangement comprises a multipole magnet rotatable around a rotation axis. A geometric arrangement of the multipole magnet is rotationally asymmetric with respect to the rotation axis. A plurality of magnetic field sensor circuits are placed around the rotation axis at predefined equidistant angular positions in a predefined axial distance from the multipole magnet, wherein each magnetic field sensor circuit comprises a first magnetic field sensor element sensitive to first magnetic field component and a second magnetic field sensor element sensitive to a second magnetic field component perpendicular to the first magnetic field component. Processing circuitry is configured to compute a first intermediate angular information based on a combination of signals from the plurality of first magnetic field sensor elements, to compute a second intermediate angular information based on a combination of signals from the plurality of second magnetic field sensor elements, and to compute an estimate of a rotation angle of the fixture and/or the multipole magnet based on the first and second intermediate angular information.

20 Claims, 11 Drawing Sheets

(58) Field of Classification Search
USPC .............. 324/207.2, 207.21, 207.24, 207.25
See application file for complete search history.

(56) References Cited

U.S. PATENT DOCUMENTS

| | | | | |
|---|---|---|---|---|
| 6,847,134 B2* | 1/2005 | Frissen | ................ | H02K 41/031 310/12.05 |
| 7,064,537 B2* | 6/2006 | Sudo | ...................... | G01D 5/145 324/207.21 |
| 7,417,421 B2* | 8/2008 | Wendt | .................... | G01D 5/145 324/207.21 |
| 8,058,866 B2* | 11/2011 | Granig | ................... | G01D 5/145 324/207.21 |
| 8,324,891 B2* | 12/2012 | Kejik | ................... | G01R 33/077 324/207.11 |
| 8,525,513 B2* | 9/2013 | Servel | .................... | G01D 5/145 324/207.21 |
| 9,523,589 B2* | 12/2016 | Nakamura | ............. | G01R 33/07 |
| 2001/0055040 A1* | 12/2001 | Nojima | ................... | B41J 11/42 347/16 |
| 2002/0021124 A1 | 2/2002 | Schott | .................... | G01R 33/07 324/207.2 |
| 2005/0007104 A1* | 1/2005 | Lequesne | ............... | G01D 5/145 324/207.25 |
| 2005/0162157 A1* | 7/2005 | Kamizino | .............. | G01D 5/145 324/207.25 |
| 2006/0028203 A1* | 2/2006 | Kawashima | ........... | G01D 5/145 324/207.25 |
| 2009/0001965 A1* | 1/2009 | Ausserlechner | ........ | G01P 21/02 324/202 |
| 2009/0146647 A1* | 6/2009 | Ausserlechner | ..... | G01D 5/2451 324/207.21 |
| 2010/0176804 A1* | 7/2010 | Ausserlechner | ....... | G01D 3/028 324/207.25 |
| 2012/0176070 A1* | 7/2012 | Wallrafen | .......... | G01D 5/24461 318/400.04 |
| 2013/0057257 A1* | 3/2013 | Friedrich | ............. | G01R 33/072 324/207.2 |
| 2013/0218517 A1 | 8/2013 | Ausserlechner | | |
| 2015/0022186 A1* | 1/2015 | Ausserlechner | ....... | G01D 5/145 324/207.2 |
| 2015/0137797 A1* | 5/2015 | Ausserlechner | ......... | G01D 3/08 324/207.2 |
| 2015/0142376 A1* | 5/2015 | Ausserlechner | ....... | G01D 5/145 702/151 |
| 2015/0247903 A1* | 9/2015 | Maurio | .................. | G01D 5/145 324/207.13 |
| 2015/0276893 A1* | 10/2015 | Kaufmann | ........... | G01R 33/025 324/225 |
| 2015/0285661 A1* | 10/2015 | Ausserlechner | ......... | G01D 5/16 324/207.21 |
| 2015/0293184 A1* | 10/2015 | Kaufmann | .......... | G01R 33/0017 324/225 |
| 2015/0354999 A1* | 12/2015 | Ausserlechner | ........ | H01L 43/08 73/866.5 |
| 2016/0069708 A1 | 3/2016 | Ausserlechner | | |
| 2016/0069710 A1* | 3/2016 | Ausserlechner | ......... | G01D 5/20 324/207.23 |
| 2016/0223358 A1 | 8/2016 | Ausserlechner | | |
| 2016/0258781 A1* | 9/2016 | Ausserlechner | ......... | G01D 3/08 |
| 2017/0163182 A1* | 6/2017 | Fedigan | .................. | H02K 29/08 |
| 2017/0241803 A1 | 8/2017 | Ausserlechner | | |
| 2018/0128648 A1* | 5/2018 | Schmitt | ................ | G01D 5/1655 |
| 2018/0172474 A1 | 6/2018 | Ausserlechner | | |
| 2018/0231400 A1* | 8/2018 | Okumura | ............. | G01D 5/2451 |
| 2019/0271568 A1* | 9/2019 | Kozomora | ........... | G01R 33/072 |

FOREIGN PATENT DOCUMENTS

| | | |
|---|---|---|
| CN | 103256883 A | 8/2013 |
| CN | 105403233 A | 3/2016 |
| DE | 10036281 A1 | 2/2002 |
| DE | 102006060622 A1 | 6/2008 |
| DE | 102012202404 A1 | 8/2013 |
| DE | 102015115247 A1 | 3/2016 |
| DE | 102015101363 A1 | 8/2016 |
| DE | 102016102978 A1 | 8/2017 |
| DE | 102016124948 A1 | 6/2018 |

\* cited by examiner

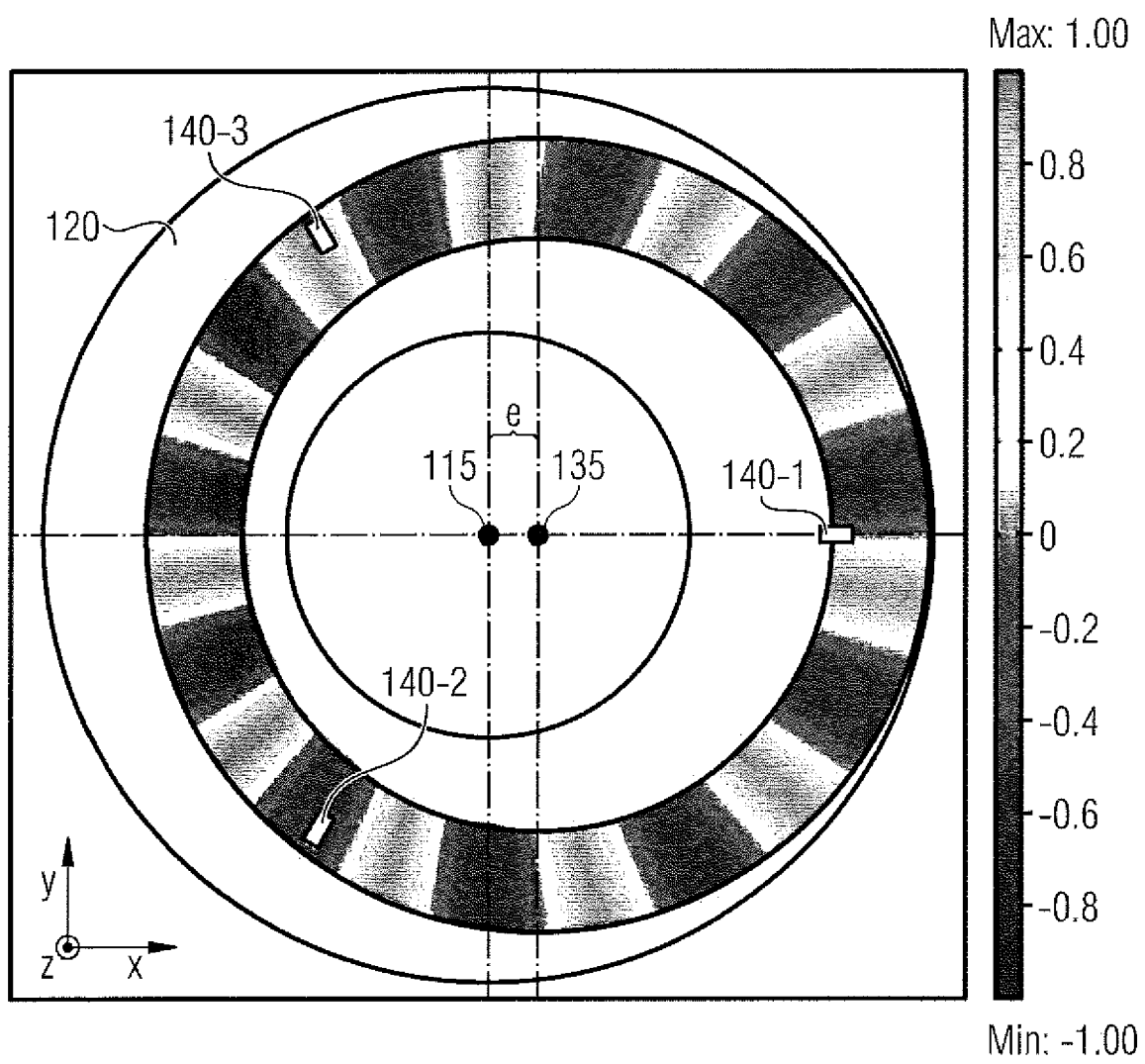

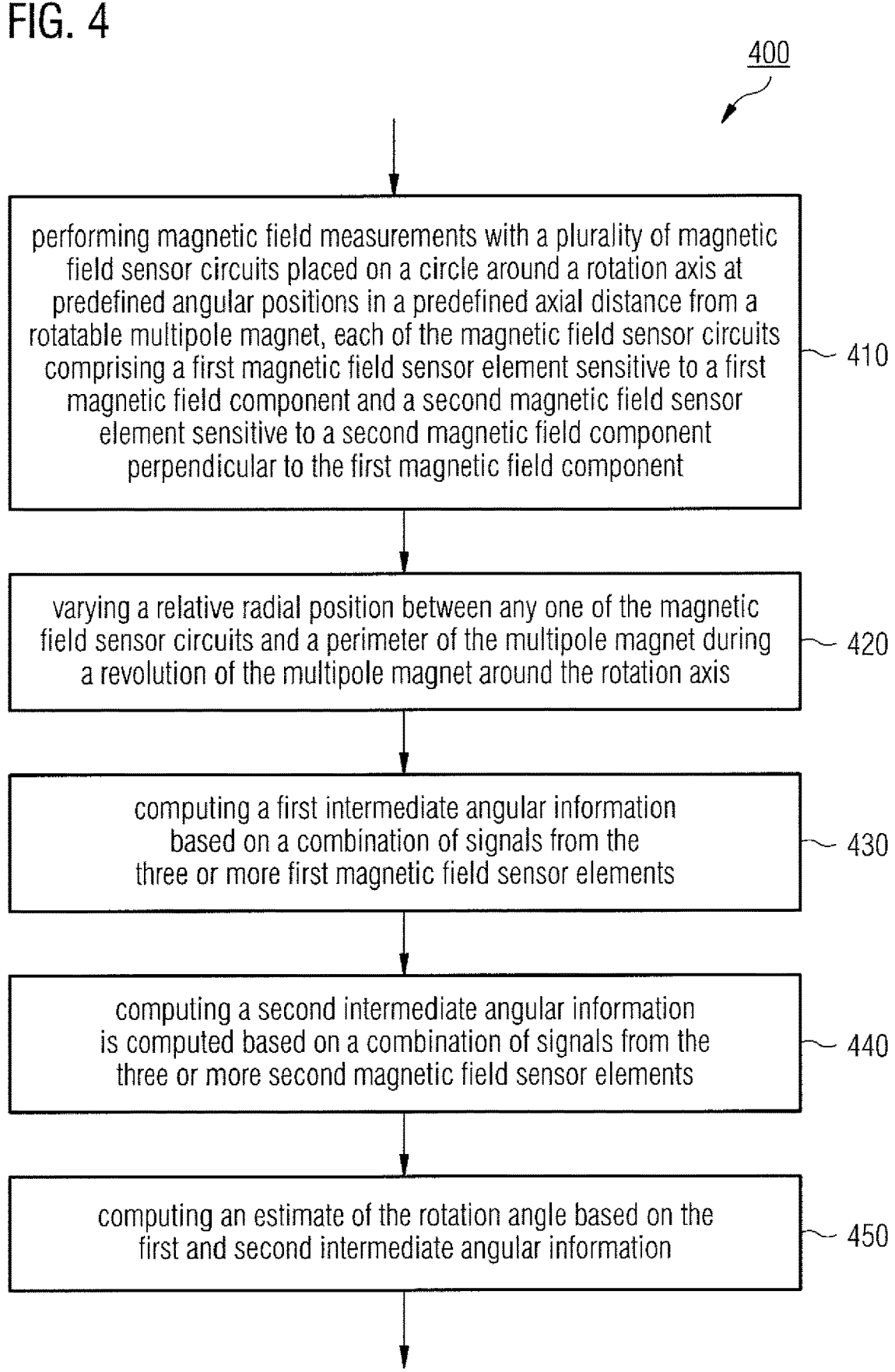

equal aperature angles $\alpha$ for all poles
for p pole pairs: $\alpha = \dfrac{360°}{2*p}$

MAGNETIC ANGLE SENSOR ARRANGEMENT AND METHOD FOR ESTIMATING A ROTATION ANGLE

RELATED APPLICATIONS

This application claims priority under 35 U.S.C. § 119 to German Patent Application No. 102017128869.4, filed on Dec. 5, 2017, the contents of which are incorporated by reference herein in their entirety.

TECHNICAL FIELD

The present disclosure relates to methods and apparatuses for estimating rotation angles of rotatable bodies.

BACKGROUND

Magnetic sensors, such as Hall sensors or magnetoresistive sensors, are used in many modern day angular position sensing systems to detect the angular position of a rotating object, such as a shaft, a pole wheel, or a gear wheel. Such angular position sensors have applications in many fields such as automotive, industrial, etc. For example, in automobiles angular position sensors are used in brushless direct current (BLDC) motors to detect rotor position during operation or in steering angle measurement to provide information about the direction a driver wants to go for automatic steering applications (e.g., electric power steering, electronic stability control, active steering systems, parking assistance systems, etc.).

Some applications require unambiguous angular measurements within 0° to 360°, i.e., within one full revolution of the rotating object, or even from 0° to multiples of 360°, i.e., multiple revolutions. To provide exact measurements for such applications can be demanding and there is a need for improved angle measurement concepts.

SUMMARY

This need is met by magnetic angle sensor arrangements and methods for estimating rotation angles in accordance with the independent claims. Further advantageous embodiments are addressed by the dependent claims as well as the detailed description.

According to a first aspect, the present disclosure provides a magnetic angle sensor arrangement. The magnetic angle sensor arrangement comprises a multipole magnet which is rotatable around a rotation axis. A geometric arrangement/setup of the multipole magnet is rotationally asymmetric with respect to the rotation axis. A plurality of magnetic field sensor circuits are placed around the rotation axis at predefined equidistant angular positions in a predefined axial distance from the multipole magnet. Each of the plurality of magnetic field sensor circuits comprises a respective first magnetic field sensor element sensitive to a first magnetic field component and a respective second magnetic field sensor element sensitive to a second magnetic field component which is perpendicular to the first magnetic field component. The magnetic angle sensor arrangement further comprises processing circuitry which is configured to compute a first intermediate angular information based on a combination of signals from the plurality of first magnetic field sensor elements, to compute a second intermediate angular information based on a combination of signals from the plurality of second magnetic field sensor elements, and to compute an estimate of a rotation angle of the multipole magnet based on the first and second intermediate angular information. Due to the multipole magnet's rotationally asymmetric setup and evaluating at least two perpendicular magnetic field components (e.g., axial or tangential, and radial) at a plurality of equidistant angular positions, ambiguous angular measurements can be resolved to obtain an unambiguous result (Nonius principle).

In the context of the present disclosure, rotational asymmetry can be understood to also include rotational symmetry of merely finite degree or order. In other words, an arrangement can be understood to be rotationally asymmetric with respect to the rotation axis if it does not have rotational symmetry of infinite degree or order. As such, also an elliptic or polygonal shape of the multipole magnet, for example, can be understood rotationally asymmetric in the context of the present disclosure.

In some embodiments, the magnetic angle sensor arrangement may also comprise a fixture carrying the multipole magnet. The fixture can be any adequate means to rotatably fix the multipole magnet to a rotatable body, such as a shaft for example. In some embodiments the fixture can be implemented as a support or carrier disc, for example. The fixture may be rotationally symmetric with respect to the rotation axis. In some embodiments, the rotation axis may coincide with the axis of a rotatable shaft or another rotatable object, the rotation angle of which shall be determined by the magnetic angle sensor arrangement.

According to embodiments, each magnetic field sensor circuit comprises a first and a second magnetic field sensor element. Thus, the first magnetic field sensor element of a magnetic field sensor circuit may be essentially collocated with the second magnetic field sensor element of said magnetic field sensor circuit. The first and the second magnetic field sensor elements can be located in one common sensor package. The first and the second magnetic field sensor elements can be implemented in different semiconductor chips or they can also be implemented on a common semiconductor chip. The first and/or the second magnetic field sensor element can be implemented as Hall sensors (e.g., Hall plates, vertical Hall sensors) or as magnetoresistive sensors. Depending on the magnetic field component they should be sensitive to, they have to be positioned accordingly. If the magnetic field component they should be sensitive to is perpendicular to the sensing surface, a Hall plate can be used, for example.

In some embodiments, the processing circuitry can be located near the magnetic field sensor circuits. For example, it could be implemented on the same chip as one of the magnetic field sensor circuits. In other embodiments, the processing circuitry can be located separately and remotely from the magnetic field sensor circuits. A signal interface between the magnetic field sensor circuits and the processing circuitry can be wired or wireless, depending on the specific application and/or installation. The processing circuitry may be implemented using a Digital Signal Processor (DSP), a Field-Programmable-Gate-Array (FPGA), or an Application Specific Integrated Circuit (ASIC), for example.

In some embodiments, a geometric arrangement of the multipole magnet on the fixture is rotationally asymmetric with respect to the rotation axis. This rotational asymmetric arrangement of the multipole magnet with respect to the rotation axis can further improve unambiguous angular measurements.

In some embodiments, the multipole magnet itself can be rotationally asymmetric with respect to the rotation axis (e.g., in case of an elliptic shape). In other embodiments, the multipole magnet itself can be rotationally symmetric but installed on the fixture in a rotationally asymmetric fashion. In the latter case, the symmetry or gravity center of the multipole magnet can be radially displaced from the rotation axis. In some embodiments, the gravity center of the multipole magnet can be displaced from the rotation axis with a radial displacement in the range between 1 mm and 5 mm. This range may lead to good measurement results, while at the same time limiting unbalanced masses.

In some embodiments, the multipole magnet can be of annular shape and placed on the fixture eccentrically to the rotation axis. In the present context "annular" is supposed to also comprise non-perfect annular but annular-like shapes. Magnetic multipole rings of (essentially) annular shape may be manufactured efficiently.

In some embodiments, a relative radial position between any one of the magnetic field sensor circuits and a perimeter of the multipole magnet varies during a revolution of the multipole magnet around the rotation axis. While in some embodiments this relative radial variation may be obtained via the rotational asymmetric arrangement of the multipole magnet, other implementations are conceivable where the relative radial variation may be obtained by varying the radial positions of the magnetic field sensor circuits and/or by varying the position of the multipole magnet in another way. In such cases, the geometric arrangement of the multipole magnet (on the fixture) could also be rotationally symmetric with respect to the rotation axis. The relative radial variation between the sensors and the multipole magnet can lead to varying radial magnetic field components, which in turn can further improve the unambiguous angular measurements.

In some embodiments, due to the relative radial variation, a first radial distance between a (inner or outer) perimeter of the multipole magnet and one of the magnetic field sensor circuits at a first angular position of the multipole magnet can differ from a second radial distance between the perimeter of the multipole magnet and the same magnetic field sensor circuit at a second angular position of the multipole magnet. More specifically, a radial position of the inner perimeter of the multipole magnet can essentially coincide with a radial position of a given magnetic field sensor circuit at a first angular position of the multipole magnet. Likewise, a radial position of the outer perimeter of the multipole magnet can essentially coincide with the radial position of the same magnetic field sensor circuit at a second angular position of the multipole magnet. In some embodiments the shape of the magnet and the radial position of the magnetic field sensor circuits are such that for all rotational positions of the magnet all magnetic field sensor circuits are located between the inner perimeter and the outer perimeter of the magnet in plan view (or top view). In further embodiments, at one rotational position phi1 a specific magnetic field sensor circuit is closest to the inner perimeter of the magnet and at the opposite rotational position phi1+180° this specific magnetic field sensor circuit is closest to the outer perimeter of the magnet. In further embodiments, for all intermediate rotational positions the spacing between this specific magnetic field sensor circuit and one of the inner and outer perimeters of the magnet varies monotonously versus rotational position. In further embodiments this holds for all magnetic field sensor circuits, whereby the rotational position phi1 is different for each magnetic field sensor circuit. In further embodiments the minimum radial distance between inner perimeter of the magnet and each magnetic field sensor circuit is the sum of all lateral assembly tolerances of magnet and sensor circuit, so that under worst case conditions of maximum radial placement errors the magnetic field sensor circuit is still guaranteed to be within the outer perimeter of the magnet and outside the inner perimeter of the magnet. The skilled person having benefit from the present disclosure will appreciate that the expression "coincide" should be interpreted reasonably and can also comprise small radial misalignments, for example due to manufacturing tolerances. A perfect radial coincidence is not required.

In some embodiments, the predefined axial distance between the magnetic field sensor circuits and the multipole magnet is in a range from 1 mm to 3 mm. Such axial distances can lead to good magnetic field strengths at the magnetic field sensor circuits and hence to good measurement results. At the same time they allow for mechanical tolerances.

In some embodiments, the multipole magnet comprises $p \geq 2$ pole pairs (i.e., number of poles is $\geq 4$) of equal aperture angle $\alpha$ with respect to the rotation axis. In other words, the magnetic symmetry center of the multipole magnet may be located concentrically with regard to the rotation axis. In case of a magnetic multipole ring which is placed on the fixture eccentrically to the rotation axis this means that the magnetic symmetry center of the magnetic multipole ring coincides with the rotation axis.

In some embodiments, $N \geq 3$ magnetic field sensor circuits can be placed around the rotation axis with an angular spacing of $360°/N$ between adjacent magnetic field sensor circuits. In a basic setup with $N=3$ magnetic field sensor circuits, this leads to an angular spacing of $120°$ between adjacent magnetic field sensor circuits. In some embodiments the radial distance of all magnetic field sensor circuits to the rotation axis is identical.

In some embodiments, the multipole magnet can comprise $p \geq 2$ pole pairs, with $p \bmod N \neq 0$. In such setups, the magnetic field sensor circuits can be placed around the rotation axis with an angular spacing of $360°/N/p$ between adjacent magnetic field sensor circuits. This can lead to more accurate results.

In some embodiments, the magnetic field sensor circuits comprise $N=3$ magnetic field sensor circuits placed around the rotation axis at angular positions of $0°$, $120°$, and $240°$. The processing circuitry is configured to compute the first intermediate angular information, phi', based on phi'=arctan (Co, Si). Thereby arctangent denotes the inverse tangent function $\tan(Co, Si)=Si/Co$. In this embodiment, $Co=B_{z,0°}-(B_{z,120°}+B_{z,240°})/2$ and $Si=\sqrt{3}*(B_{z,120°}-B_{z,240°})/2$. $B_{z,0°}$ denotes an axial magnetic field component measured at $0°$, $B_{z,120°}$ denotes an axial magnetic field component measured at $120°$, and $B_{z,240°}$ denotes an axial magnetic field component measured at $240°$. Instead of axial magnetic field components, also tangential magnetic field components could be used. The processing circuitry can further be configured to compute the second intermediate angular information, phi", based on phi"=arctan(Co', Si'), where $Co'=B_{r,0°}-(B_{r,120°}+B_{r,240°})/2$ and $Si'=\sqrt{3}*(B_{r,120°}-B_{r,240°})/2$. $B_{r,0°}$ denotes a radial magnetic field component measured at $0°$, $B_{r,120°}$ denotes a radial magnetic field component measured at $120°$, and $B_{r,240°}$ denotes a radial magnetic field component measured at $240°$.

According to a further aspect, it is provided a magnetic angle sensor arrangement comprising a fixture being rotatable around a rotation axis. A multipole magnet is attached to the fixture. A plurality ($N \geq 2$) of magnetic field sensor circuits is placed on a circle around the rotation axis at predefined angular positions in a predefined axial distance from the multipole magnet. Each magnetic field sensor circuit comprises a first magnetic field sensor element sensitive to a first magnetic field component and a second magnetic field sensor element sensitive to a second field component perpendicular to the first magnetic field component. A relative radial position between any one of the magnetic field sensor circuits and a perimeter of the multipole magnet varies during a revolution of the fixture and/or the multipole magnet around the rotation axis. Processing circuitry is configured to compute a first intermediate angular information based on a combination of signals from the plurality of first magnetic field sensor elements, to compute a second intermediate angular information based on a combination of signals from the plurality of second magnetic field sensor elements, and to compute an estimate of a rotation angle of the fixture and/or the multipole magnet based on the first and second intermediate angular information.

In some embodiments, the variation of the relative radial position between any one of the magnetic field sensor circuits and the perimeter of the multipole magnet can be obtained by a geometric setup of the multipole magnet which is rotationally asymmetric with respect to the rotation axis.

According to a further aspect of the present disclosure, it is provided a closed loop multipole magnet having a magnetic symmetry center which is offset or displaced from the multipole magnet's gravity center.

In some embodiments, the closed loop multipole magnet can have the shape of a ring/annulus in a plan (top) view. In the context of the present disclosure, a ring- or annular shape can be understood as any closed loop shape surrounding a hole and does not necessarily mean a circular shape or perimeter. Furthermore, the multipole magnet does not necessarily have to be planar but could also be of spherical cap shape.

The multipole magnet can have the shape of a ring/annulus in a plan (top) view and can have a magnetic symmetry point in said plan view from which all magnetic north and/or south poles appear under the same aperture angle $\alpha$, wherein in said plan view the gravity center of all magnetized portions of the multipole magnet does not coincide with said symmetry point.

In some embodiments, the closed loop multipole magnet can be placed on a support carrier being rotatable around a rotation axis. A geometric arrangement of the multipole magnet on the support carrier is rotationally asymmetric with respect to the rotation axis. Due to the rotational asymmetry, different first and second intermediate angular information can be obtained. Based on the different first and second intermediate angular information, good estimates of the rotation angle of the multipole magnet placed on a support carrier can be determined.

In some embodiments, a gravity center of the multipole magnet on the support carrier is radially displaced from the rotation axis, leading to the rotational asymmetry. Such a setup can be manufactured and installed efficiently. Alternatively, the magnet may be rotationally symmetric, but not all of its volume is magnetized: then only a rotationally asymmetric part of it is magnetized in a multipole pattern while the rest is not magnetized. This can be beneficial, because it avoids eccentric mechanical load, since the gravity center of the magnet is on the rotation axis even though the gravity center of the magnetized volume of the magnet is off the rotation axis.

In some embodiments, the multipole magnet is of annular shape and placed on the support carrier eccentrically to the support carrier's rotation axis. Such a setup can be manufactured and installed efficiently.

In some embodiments, the gravity centers of the magnet and of the support carrier may be both shifted off the rotation axis in opposite directions from the rotation axis in an effort to counterbalance the centrifugal forces of both parts on the shaft, especially, if it is rotated at high rotational speeds.

In some embodiments, the multipole magnet comprises $p \geq 2$ pole pairs of respective equal aperture angle with respect to the rotation axis. In other words, the magnetic symmetry center of the multipole magnet is located concentrically with regard to the rotation axis. In case of a magnetic multipole ring which is placed on the support carrier eccentrically to the rotation axis this means that the magnetic symmetry center of the magnetic multipole ring coincides with the rotation axis of the support carrier.

According to yet a further aspect, it is provided a method for estimating a rotation angle. The method includes performing magnetic field measurements with a plurality of magnetic field sensor circuits placed around a rotation axis at predefined equidistant angular positions and in a predefined axial distance from a rotatable multipole magnet. Each of the plurality of magnetic field sensor circuits comprises a first magnetic field sensor element sensitive to a first (e.g., axial or tangential) magnetic field component and a second magnetic field sensor element sensitive to a second (e.g., radial) magnetic field component perpendicular to the first magnetic field component. The method includes varying a relative radial position between any one of at least the second magnetic field sensor elements and a perimeter of the multipole magnet during a revolution of the multipole magnet around the rotation axis. A first intermediate angular information is computed based on a combination of signals from the plurality of first magnetic field sensor elements. A second intermediate angular information is computed based on a combination of signals from the plurality of second magnetic field sensor elements. The rotation angle is estimated based on the first and second intermediate angular information. The relative radial variation can lead to varying radial magnetic field components. This additional radial information can further improve an unambiguous estimate of the rotation angle.

The plurality of first magnetic field sensor elements can be placed around the rotation axis on a respective first reading circle. The plurality of second magnetic field sensor elements can be placed around the rotation axis on a respective second reading circle. The radii of the first and second reading circles can be identical or can also differ from each other. Likewise the respective predefined axial distances between the first and the second reading circle and the multipole magnet can be identical or can also differ from each other.

In some embodiments, varying the relative radial position can include rotating the multipole magnet about a rotation axis in a rotationally asymmetric manner (i.e., the multipole magnet has a magnetic symmetry of zero or finite order). In other words, varying relative radial position can include providing a geometric setup of the multipole magnet which is rotationally asymmetric with respect to the rotation axis.

In some embodiments, varying a relative radial position can include placing the magnetic multipole magnet on a carrier rotating around a rotation axis, wherein a geometric arrangement of the magnetic multipole magnet on the carrier is rotationally asymmetric with respect to the rotation axis. As has been explained before, this rotational asymmetry can be obtained in different possible ways.

As will be explained in the following in more detail, various embodiments of the present disclosure can yield accurate rotation angle estimates in the range from 0° to 360° and more.

BRIEF DESCRIPTION OF THE DRAWINGS

Some examples of apparatuses and/or methods will be described in the following by way of example only, and with reference to the accompanying figures, in which

FIG. 3 shows a top view of the magnetic angle sensor arrangement of FIG. 1;

FIG. 4 shows a basic flowchart of a method for estimating a rotation angle;

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
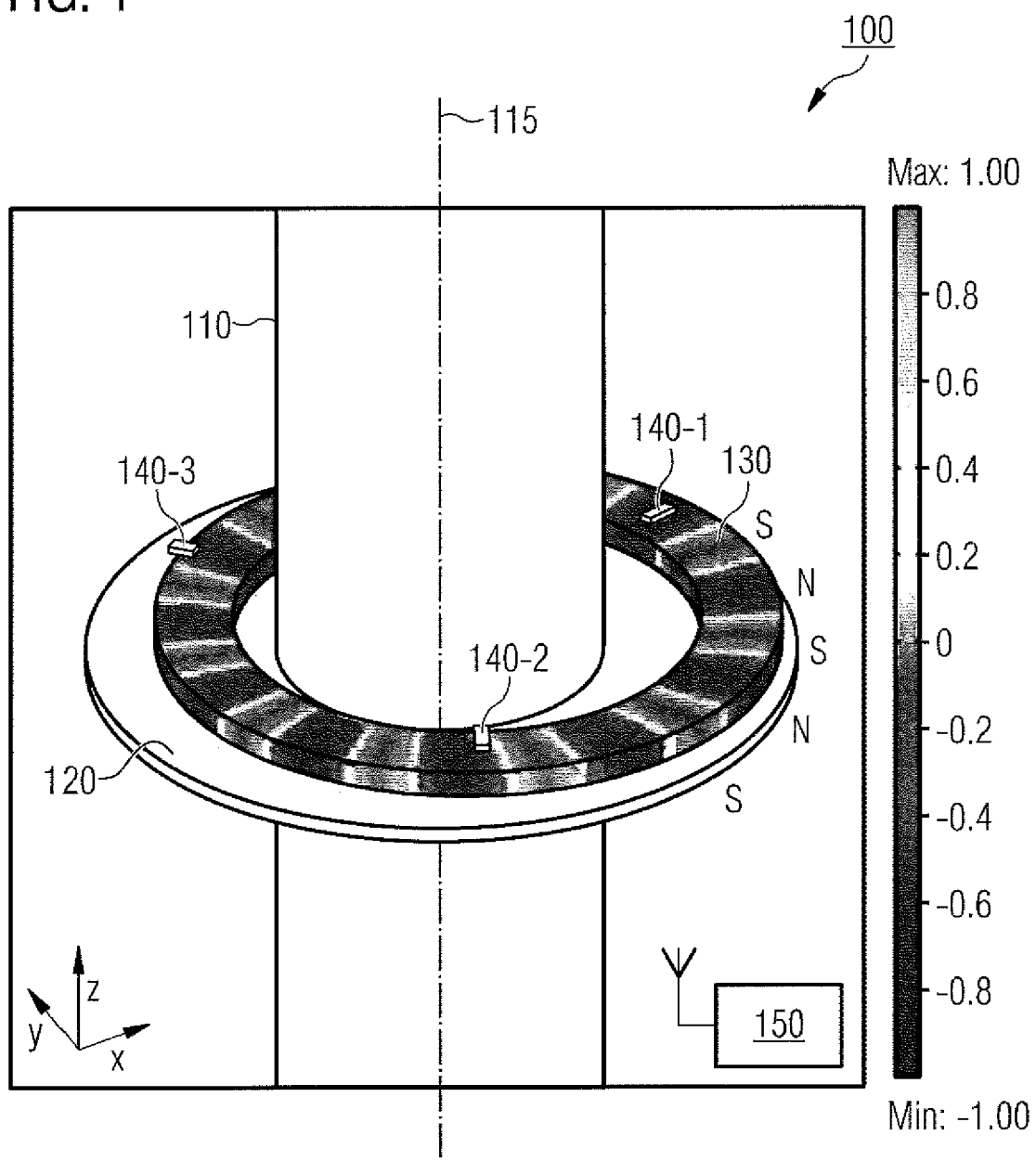
FIG. 1 shows a perspective view of an example magnetic angle sensor arrangement.
Figure 2:
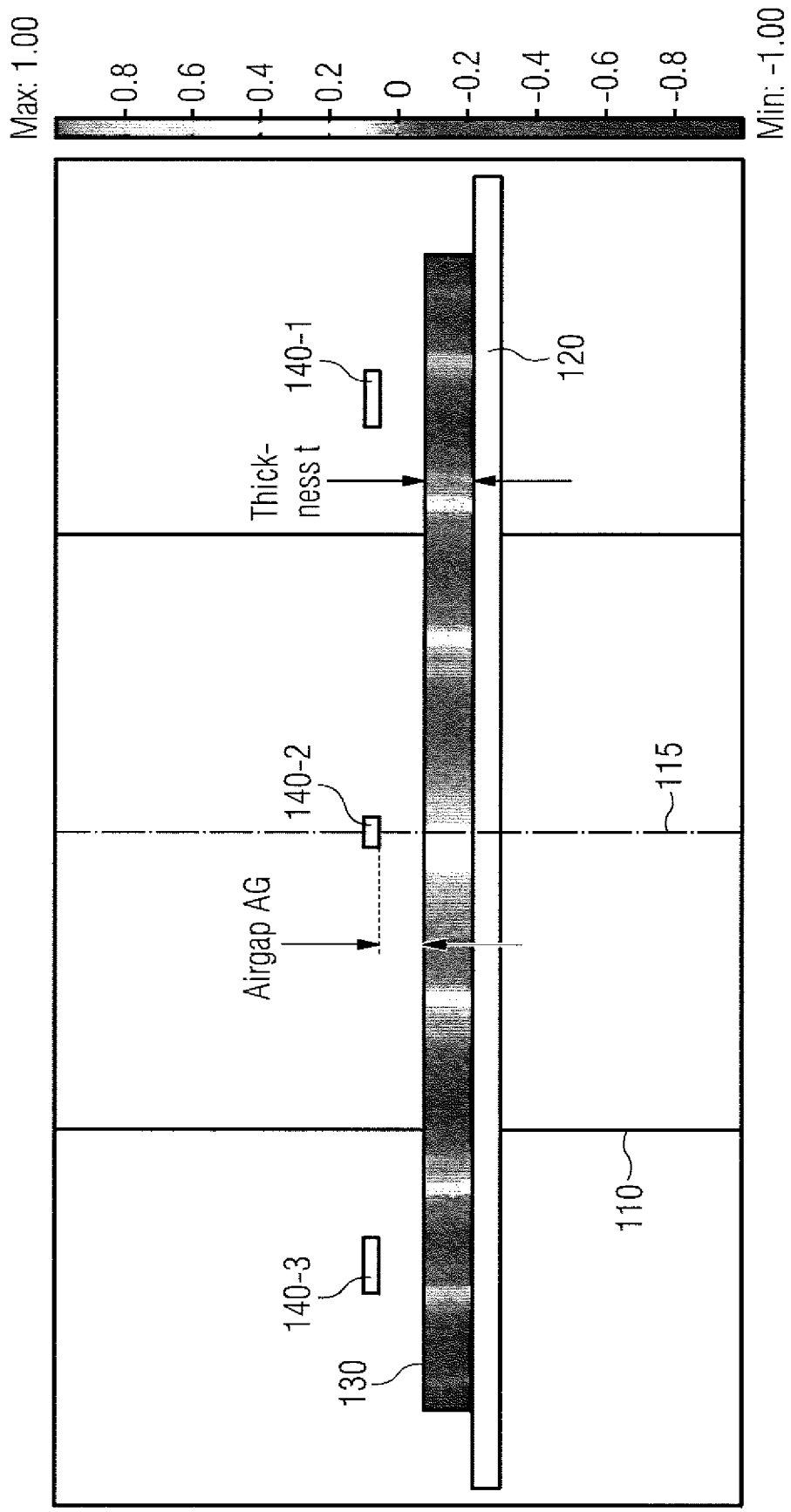
FIG. 2 shows a side view of the magnetic angle sensor arrangement of FIG. 1.

FIGS. 1 to 3 shows different views of a magnetic angle sensor arrangement 100 according to an example embodiment. FIG. 1 is a perspective view, FIG. 2 a side view, and FIG. 3 is a top view of the example embodiment.

In the illustrated example, the magnetic angle sensor arrangement 100 is arranged around a rotatable shaft 110. Shaft 110 extends in z-direction which will also be denoted as axial direction throughout this specification. The shaft's axis in z-direction can be regarded as rotation axis 115. In some applications (e.g., steering wheel, steering column, etc.), it might be desirable to determine a rotation angle of shaft 110 within a range of 0° to 360° or even more.

Magnetic angle sensor arrangement 100 comprises a fixture 120 which is rotatable around the rotation axis 115. In the illustrated example, fixture 120 is a support disc which is attached to the shaft 110 in a torque proof manner such that shaft 110 and fixture rotate commonly. Shaft 110 extends perpendicular to the support disc 120, which spans the x-y-plane in the illustrated example.

A multipole magnet 130 is placed on the fixture 120. In the illustrated example, multipole magnet 130 is of annular shape with magnetic north- (N-) and south- (S-)poles alternating in circumferential direction. As can be seen from FIG. 1 and FIG. 3, a geometric arrangement of the multipole magnet 130 on the fixture 120 is rotationally asymmetric with respect to the rotation axis 115. While the rotational asymmetry can be implemented in various ways, a symmetry or gravity center 135 of the multipole magnet 130 is radially displaced from the rotation axis 115 in the illustrated example. In other words, the example magnetic multipole magnet 130 of annular shape is placed on the support disc 120 eccentrically to the rotation axis 115. The exact radial displacement between the gravity center 135 of the multipole magnet 130 and the rotation axis 115 will depend on the size of the whole arrangement. However, for typical automotive applications, the gravity center 135 of the magnetic multipole magnet 130 may be displaced from the rotation axis 115 by a radial displacement e in the range between 1 mm and 5 mm. The person having benefit from the present disclosure will appreciate that other forms of rotational asymmetry could be implemented, for example by an elliptical shape of the multipole magnet 130. Additionally or alternatively, the magnetic multipole ring 130 could have a radial width w varying in circumferential direction.

In the illustrated example, the magnetic angle sensor arrangement 100 comprises three magnetic field sensor circuits 140-1, 140-2, and 140-3 placed on a (virtual) circle around the rotation axis 115 at predefined angular positions in a predefined axial distance AG a from the multipole magnet 130. The person having benefit from the present disclosure will appreciate that also more than three magnetic field sensor circuits 140 are possible in order to increase measurement accuracy. The magnetic field sensor circuits 140-1, 140-2, and 140-3 are placed around the rotation axis 115 at equal radial distance on a so-called reading circle. As will become apparent, there is some interrelation between the radius of the reading circle and the eccentricity of the multipole magnet 130. The axial distance AG between the magnetic field sensor circuits 140-1, 140-2, and 140-3 and the multipole magnet 130 will depend on the size of the whole arrangement. However, for typical automotive applications, the axial distance can be in a range from 1 mm to 3 mm.

Each of the magnetic field sensor circuits 140-1, 140-2, and 140-3 comprises a first magnetic field sensor element (not explicitly shown) which is sensitive to an axial or tangential magnetic field component and a second magnetic field sensor element (not explicitly shown) which is sensitive to a radial magnetic field component. Thus, the respective first magnetic field sensor element of each of the magnetic field sensor circuits 140-1, 140-2, and 140-3 can measure a first (e.g., axial or a tangential) magnetic field component. The following description refers to respective first magnetic field sensor elements which can measure axial (z-direction) magnetic field components $B_z$. The respective second magnetic field sensor element of each of the magnetic field sensor circuits 140-1, 140-2, and 140-3 can measure second (e.g., radial) magnetic field components $B_r$, perpendicular to the first magnetic field components. The respective first and second magnetic field sensor elements of magnetic field sensor circuits 140-1, 140-2, and 140-3 may be housed in the same respective sensor packages. Thus, for the sake of simplicity it can be assumed that the respective first and second magnetic field sensor elements of magnetic field sensor circuits 140-1, 140-2, and 140-3 are essentially co-located (e.g., within a few mm). In other embodiments the first and second magnetic field sensor elements are housed in different packages and are located at different angular positions: e.g. the first magnetic field sensor elements may be located at 0°, 120°, 240° and the second magnetic field sensor elements may be located at 60°, 180°, 300°, or at 30°, 150°, 270°. It is also allowed to place the first magnetic field sensor elements on a first reading circle with a first reading radius and the second magnetic field sensor elements on a second reading circle with a second reading radius different from the first reading radius. It is also possible to place the first magnetic field sensor elements at a first axial distance AG1 to the magnet and to place the second magnetic field sensor elements at a second axial distance AG2 to the magnet, whereby AG1 may differ from AG2. In most cases one prefers to place first and second magnetic field sensor elements close together, so that they can be housed in the same sensor package and preferably even on the same semiconductor chip, because this saves manufacturing costs, material bill, and space consumption and it improves the matching and the accuracy of relative position placement between first and second magnetic field sensor elements and it reduces process spread of sensor elements.

Referring to FIG. 1, the magnetic angle sensor arrangement 100 further comprises processing circuitry 150 which is configured to determine or compute a first intermediate angular information based on a combination of signals from the three or more first magnetic field sensor elements, to compute a second intermediate angular information based on a combination of signals from the three or more second magnetic field sensor elements, and to compute an estimate of a rotation angle of the fixture 120 and/or the multipole magnet 130 based on the first and second intermediate angular information.

An example process 400 for estimating a rotation angle is summarized by the flowchart presented in FIG. 4.

Process 400 includes performing magnetic field measurements 410 via a plurality of magnetic field sensor circuits 140-1, 140-2, 140-3 placed on a circle around a rotation axis 115 at predefined angular positions in a predefined axial distance from a rotatable magnetic multipole magnet 130. Each of the plurality of magnetic field sensor circuits 140-1, 140-2, 140-3 comprises a first magnetic field sensor element sensitive to a first (e.g., axial or tangential) magnetic field component and a second magnetic field sensor element sensitive to a second (e.g., radial) magnetic field component. Process 400 further includes varying a relative radial position between any one of the magnetic field sensor circuits 140-1, 140-2, 140-3 and a perimeter of the multipole magnet 130 during a revolution of the multipole magnet 130 around the rotation axis 115. Process 400 includes computing 420 a first intermediate angular information based on a combination of measurement signals from the plurality of first magnetic field sensor elements, computing 430 a second intermediate angular information based on a combination of measurement signals from the plurality of second magnetic field sensor elements, and estimating 440 the rotation angle based on the first and second intermediate angular information. The respective measurement signals may correspond to at least one 360° revolution of the multipole magnet 130 around the rotation axis 115.

Optionally, varying 420 the relative radial position may include placing the multipole magnet 130 on a support carrier 120 rotating around the rotation axis 115, wherein a geometric arrangement of the multipole magnet on the support carrier is rotationally asymmetric with respect to the rotation axis. In some embodiments, the support carrier 120 may be rotationally symmetric and arranged concentrically to the rotation axis, wherein varying 420 the relative radial position may include placing a multipole magnet 130 of annular shape on the support carrier 120 eccentrically to the rotation axis 115.

The computation of the first intermediate angular information, the second intermediate angular information, and the estimate of the rotation angle will be described in more detail below.

The multipole magnet 130 can be a multipole permanent magnet, which is mounted eccentrically to the shaft 110 via the fixture 120 in form of a magnet supporting plate. The gravity center of the magnetized material does not need to be on the rotation axis 115, but can be shifted from it by a distance e in a radial direction.

N magnetic field sensor circuits 140-1, . . . , 140-N (N≥2) are placed on a reading circle, which is concentric with the rotation axis 115 and axially shifted a bit against the multipole magnet's 130 surface. This small axial spacing AG is also referred to as airgap. It should be as small as possible but large enough to prevent collision of the rotating parts with the stationary sensors 140. Typically, AG=1 . . . 3 mm.

The N magnetic field sensor circuits are placed on the reading circle preferably with a regular angular spacing of 360°/N. For example, for N=3 sensors they can be placed at 0°, 120°, 240° (where the 0° position is arbitrary), and for N=4 sensors they can be placed at integer multiples of 90°, and for N=5 sensors they can be at integer multiples of 72°, and so on. For N=2 sensors they may be at 0° and 90°, for example.

If the multipole magnet 130 has p equal magnetic pole-pairs, we may place the sensors 140 even closer, e.g. at 360°/N/p. Example: for N=3 and 11 pole pairs, we may place the sensors at 0°, 10.91°, and 21.82°. And for N=2 and 11 pole pairs we may place the sensors at 0° and 8.18°.

For N equidistant angle positions, the angular spacing between two adjacent magnetic field sensor circuits 140-$n$ (n=1, N) is 360°/N. For p equal pole pairs the magnetic field varies like sin(p*psi) and therefore the one magnetic field sensor circuit 140-$n$ at position psi detects a magnetic field proportional to sin(p*psi) and its neighboring magnetic field sensor circuit detects a field proportional to sin(p*psi+ p*360°/N). In order to reconstruct the rotation angle from these two sensor signals it is advantageous if p*360°/N is not an integer multiple of 180°. Thus, p should not be an integer multiple of N/2. For example, for N=3, p should not be 3, 6, 9, 12, 15, . . . . For N=4, p should not be 2, 4, 6, 8, . . . For N=5, p should not be 5, 10, 15, 20, . . . In preferred embodiments, p is an integer prime number greater than 3 and N is 3.

The illustrated example, magnetic multipole ring 130 has a radial width w and an axial thickness t, an inner radius Ri and an outer radius Ro=Ri+w. With p pole pairs of equal circumferential length, the magnetic multipole ring's magnetization has an angular period of 360°/p. Note that the circumferential length can be measured either with respect to the rotation axis or with respect to the gravitational center of the magnet mass (=ring). The top view of FIG. 3 shows the former: the borders of the magnetic multipole ring's the N- and S-poles lie on straight lines, which go through the center of rotation (axis 115) and not through the center of the magnetic multipole ring. Alternatively, it is also possible that the borders between N- and S-poles lie on straight lines, which go through a point that is on a straight line between the center of rotation and the center of the magnet ring (e.g. half way between both).

Figure 5A:
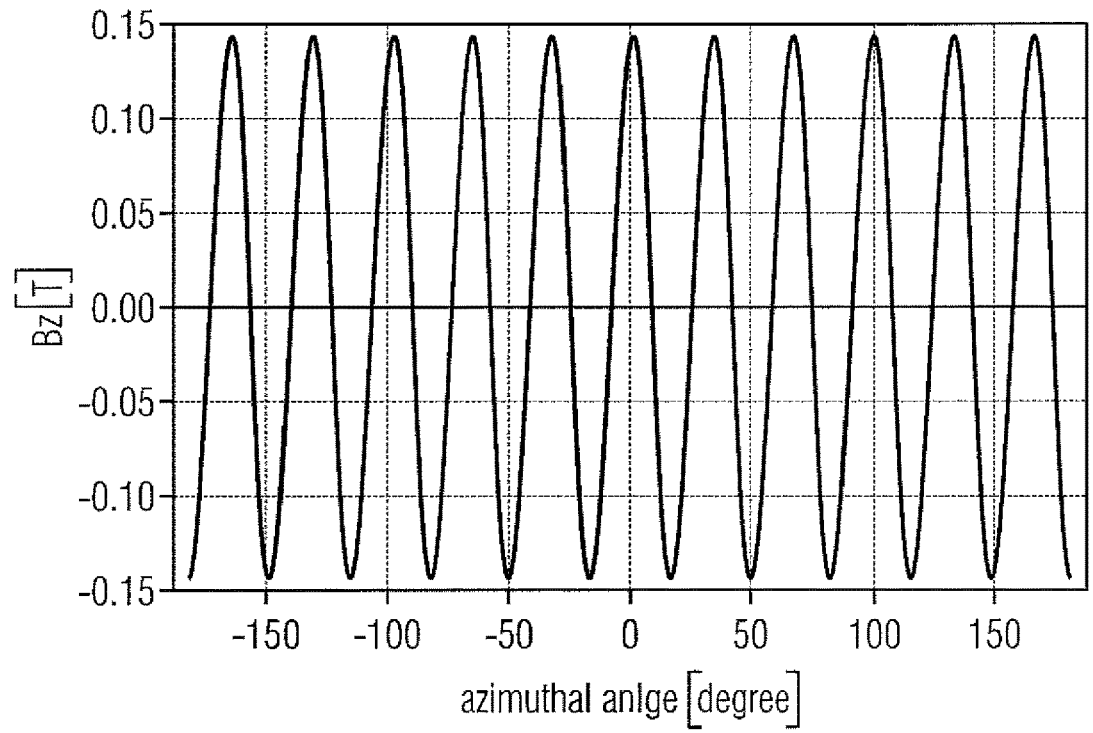
FIG. 5A shows a course of an axial magnetic field component $B_z$ caused by a multipole magnet.

In a Cartesian coordinate system, an example magnetization pattern is given by:

$Mx=Msat*x/\text{sqrt}(x^2+y^2)*\sin(p*a\tan(x,y))$, $My=Msat*(-y)/\text{sqrt}(x\hat{a}2+y^2)*\sin(p*a\tan(x,y))$, $Mz=Msat*\cos(p*a\tan(x,y))$, where Mx, My, Mz are the three Cartesian components of the magnetization vector, Msat is the saturation magnetization of the multipole magnet's 130 material, x,y,z are the coordinates of the test point, p is the number of the multipole magnet's 130 pole pairs and atan(x,y) denotes the angle between a vector from the origin (0,0) to the end point (x,y) and the positive x-direction vector. This yields a magnetization vector of constant length, which rotates p times around the radius vector while the test point moves a full revolution at constant distance to the rotation axis through the magnet material. Above the magnet 130 and in particular on the reading circle this yields a magnetic field, whose axial (z) component $B_z$ varies sinusoidally, as it is illustrated in FIG. 5A for example parameters p=11, Msat=796 kA/m, Ri=18 mm, Ro=24 mm, w=6 mm, t=2 mm, AG=2 mm. For one physical revolution of the magnetic multipole ring 130, 11 periods can be noted, each corresponding to 360/11=32.7273°. If we define one quasi-period of this waveform as the region between two successive maxima, we have 11 quasi-periods of $B_z$ in one revolution. Or in other words, $B_z$ has 11 maxima in one revolution.

If one places N=3 magnetic field sensor elements which are sensitive for the axial $B_z$-field component (e.g. Hall plates) on the reading circle at 0°, 120°, 240° to sample this field pattern and compute two first intermediate signals $Co=B_{z,0°}-(B_{z,120°}+B_{z,240°})/2$, $Si=\text{sqrt}(3)*(B_{z,120°}-B_{z,240°})/2$.

Figure 5B:
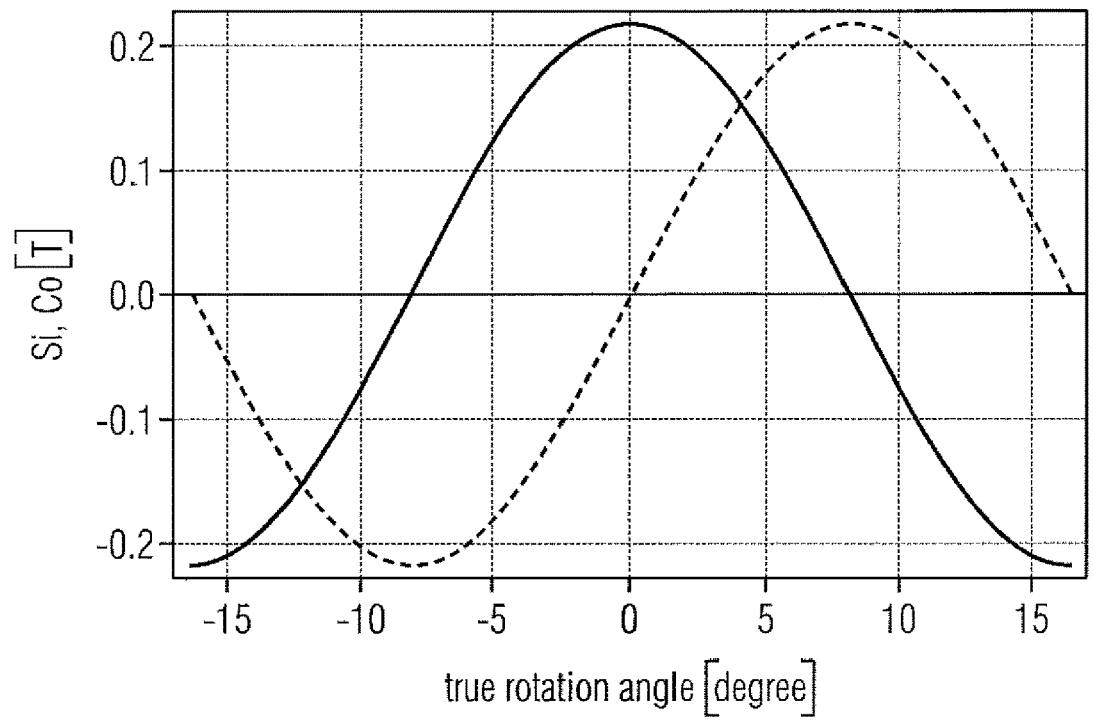
FIG. 5B shows two intermediate signals computed based on measurements of axial magnetic field components at different angular positions.

The two first intermediate signals Co and Si are plotted in FIG. 5B (outside the plotted interval the functions are exactly periodic).

Figure 5C:
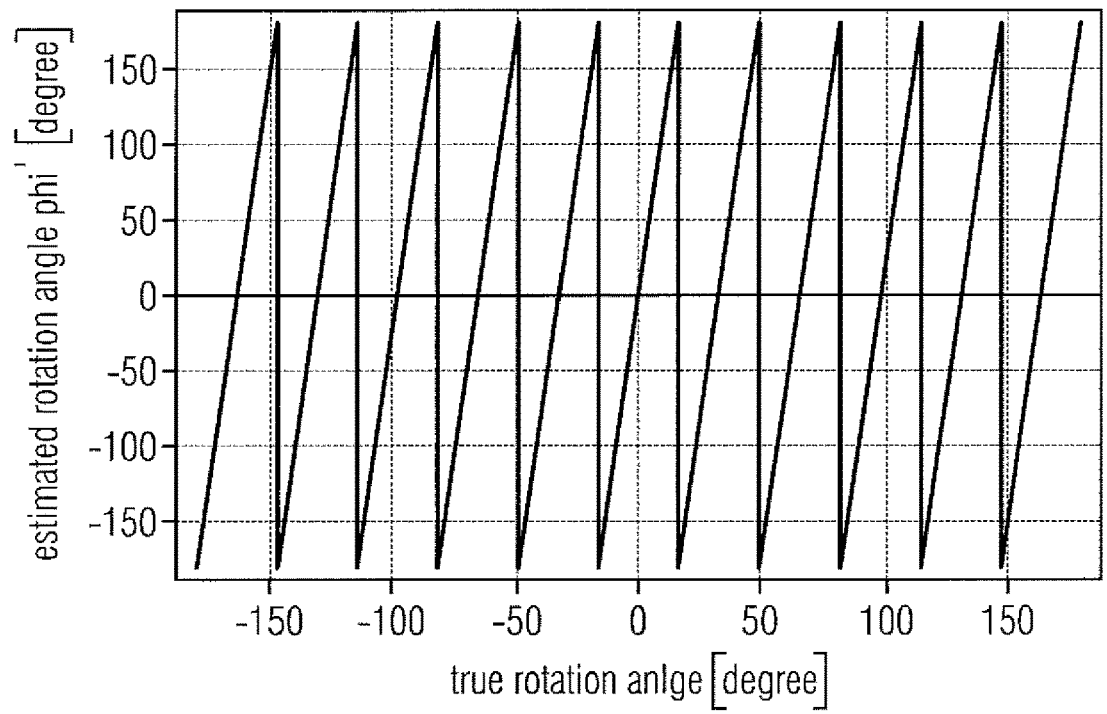
FIG. 5C shows a plot of a first intermediate angular information phi'.

Then the processing circuitry 150 can be configured to compute the first intermediate angular information, phi', according to phi'=arctan(Co, Si), which is plotted in FIG. 5C. In the illustrated example, phi' goes 11 times from −180° to +180°, while the shaft 110 turns only once from −180° to +180°. Therefore, phi' can only yield the shaft's 110 angular position up to unknown integer multiples of 360°/11.

To get a unique rotation angle reading throughout the full 360° revolution, the present disclosure proposes to use additional information which can be obtained from the eccentricity and the radial magnetic field component. Due to the eccentricity the magnetic multipole ring 130 is laterally shifted against the reading circle in top view. For the specific angular position of the magnetic multipole ring 130 in the example top view of FIG. 3, the reading circle is close to the inner perimeter of the magnetic multipole ring 130 at the right side (near sensor 140-1), and it is close to the outer perimeter of the magnetic multipole ring 130 at the left side (near sensor 140-3), whereas it is near the middle of the magnetic multipole ring 130 at the top and the bottom (e.g., near x=0 and y=+/−(Ri+Ro)/2). Said differently, a relative radial position between any one of the magnetic field sensor circuits 140 and the multipole magnet 130 varies during a revolution of the fixture 120 and/or the multipole magnet 130 around the rotation axis 115. In the illustrated example of FIG. 3, the radial position of the inner perimeter of the multipole magnet 130 coincides with the radial position of magnetic field sensor circuit 140-1 at a first angular position of the fixture 120 and/or the multipole magnet 130, and the radial position of the outer perimeter of the multipole magnet 130 coincides with the radial position of the same magnetic field sensor circuit 140-1 at a second angular position of the fixture and/or the multipole magnet 130.

It is known that the magnitude of the radial magnetic field component $B_r$ of a multipole magnetic ring approximately vanishes near the middle of the ring (Ri+w/2) for all circumferential positions, if one assumes that w<<Ri. However, it increases when one moves towards the outer perimeter of the magnetic multipole ring 130. It also increases when one moves towards the inner perimeter of the magnetic multipole ring 130. On both perimeters the radial magnetic field component varies sinusoidally, however, with a phase shift of 180°. This means that one has a positive peak of this field component at a certain circumferential (or angular) position near the outer perimeter of the ring 130 in top view while at the same circumferential position near the inner perimeter of the ring 130 in top view one has a negative peak value, and vice versa.

According to some embodiments, the eccentricity e is e=w*f with f=0.2 . . . 0.6, for example, f=0.45. The skilled person having benefit from the present disclosure will appreciate that the eccentricity e should be larger than assembly tolerances of the magnet 130 relative to the reading circle.

Figure 6A:
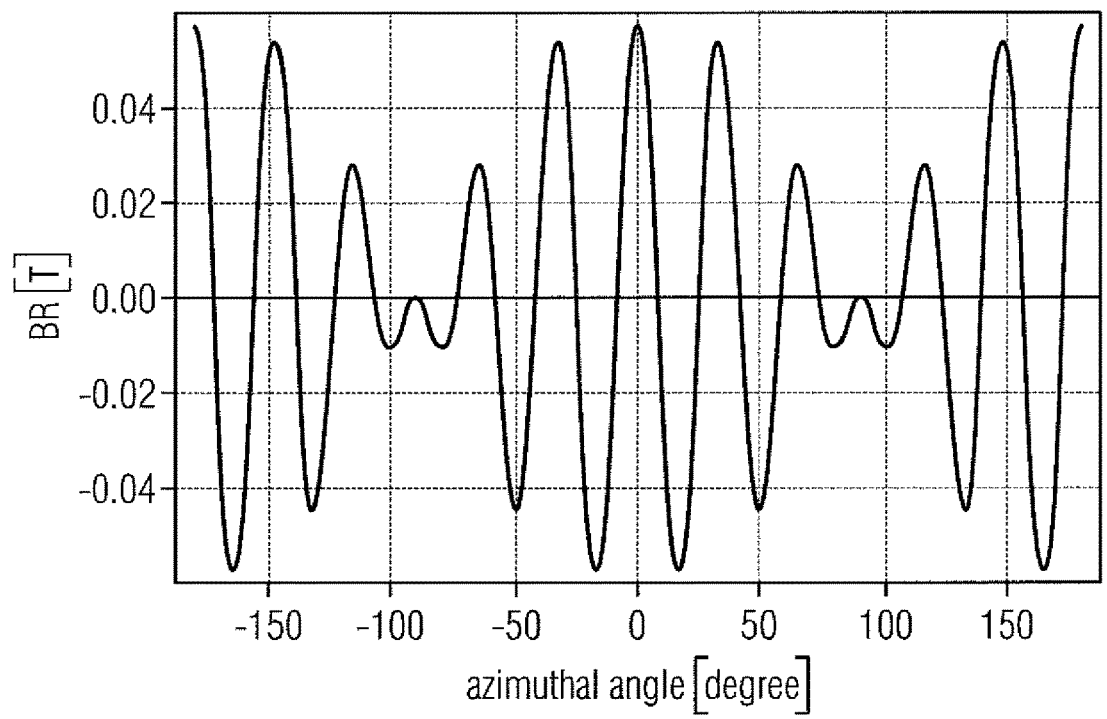
FIG. 6A shows a course of a radial magnetic field component $B_r$ caused by the multipole magnet.

For example parameters p=11, Msat=796 kA/m, Ri=18 mm, Ro=24 mm, w=6 mm, t=2 mm, AG=2 mm, the simulated radial field component sampled along the reading radius looks as shown in FIG. 6A. We note the modulation: at +/−90° an additional zero transition is forced. If we define one quasi-period of this waveform as the region between two successive maxima, we have 12 quasi-periods of the radial field component $B_r$ during one revolution. Or in other words, $B_r$ has 12 maxima in one revolution (the last one at 180° is identical with the first one at −180° and so it counts only as one maximum).

For example, vertical Hall effect devices can be used as $B_r$-field sensor elements (Br is the radial component of the magnetic field) in the magnetic field sensor circuits 140. These vertical Hall effect devices may be in on the same chip as the Hall-plates for the $B_z$-components, so that only three sensor chips would be needed for a N=3 system. Moreover, the relative placement accuracy between a Hall-plate and a VHall of a magnetic field sensor circuit 140 can be very good when they are manufactured on the same chip.

If one places N=3 sensor elements for the $B_r$-field (e.g. VHalls) on the reading circle at 0°, 120°, 240° to sample this field pattern and compute two second intermediate signals $$Co'=B_{r,0°}-(B_{r,120°}+B_{r,240°})/2,$$

$$Si'=\text{sqrt}(3)*(B_{r,120°}-B_{r,240°})/2.$$

Figure 6B:
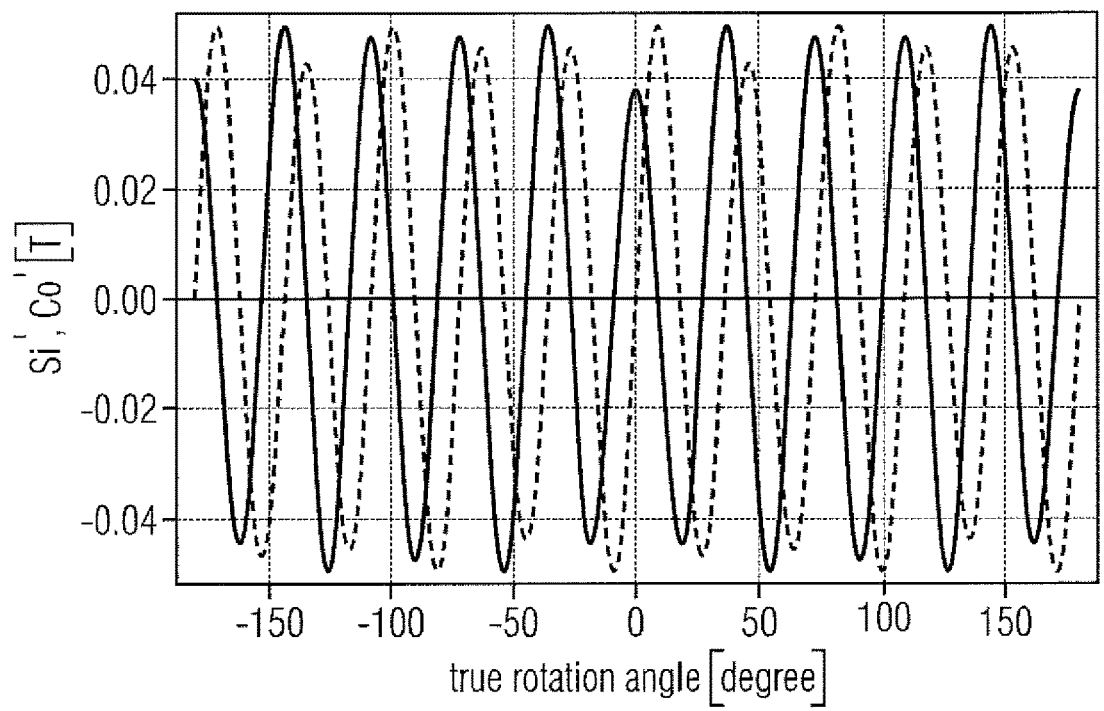
FIG. 6B shows two intermediate signals computed based on measurements of radial magnetic field components at different angular positions.

The two second intermediate signals Co' and Si' are plotted in FIG. 6B.

Note that the Si' and Co' waveforms derived from the radial magnetic field component $B_z$ do not have exactly constant amplitudes, but they can fluctuate over one revolution. Similarly, in reality also the Si and Co waveforms derived from the axial magnetic field component $B_z$ do not have exactly constant amplitudes (the shown plots of Si and Co represent an analytical approximation which neglects this fluctuation). These amplitude fluctuations on Si, Co and Si', Co' are one reason for angle errors in this type of angle sensor system. Therefore, it is advantageous to look for magnets with geometries and magnetization patterns that minimize these fluctuations. One way is to reduce the axial thickness t of the multipole magnet 130 towards its outer perimeter. This can also make $B_z(y)$ more flat for x=0 and z=constant, and reduce amplitude fluctuations of Si, Co.

Figure 6C:
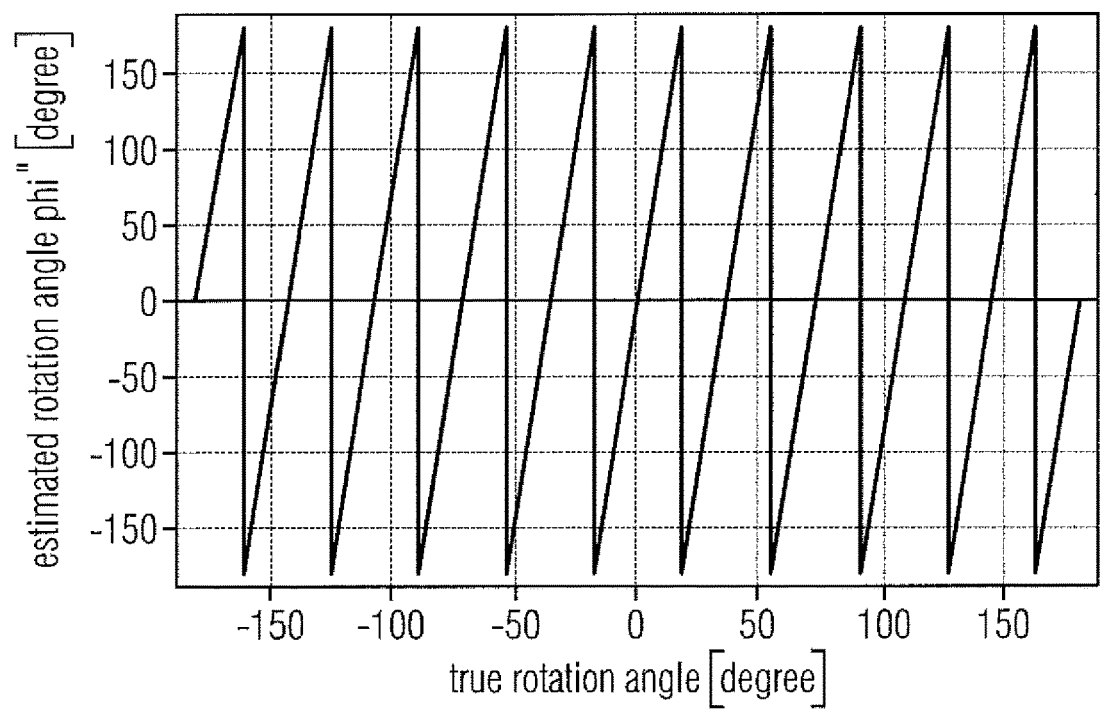
FIG. 6C shows a plot of a second intermediate angular information phi"

The processing circuitry 150 can be configured to compute the second intermediate angular information, phi", according to phi"=arctan(Co', Si'), which is plotted in FIG. 6C. Here, the output phi" goes only 10 times from −180° to +180°, while the shaft 110 turns only once from −180° to +180°.

To summarize the illustrated example(s), the signals from the $B_r$-sensor elements show 12 periods, whereas the signals from the $B_z$-sensor elements shows 11 periods. This is an important observation of the present proposal. According to embodiments, the sensor elements can be placed on a reading circle which is per definition concentric to the rotation axis 115. The radius of the reading circle can be chosen such that the number of maxima between phi" and phi' differs. In particular, phi" may have p+1 maxima per revolution, whereas phi' may have p maxima per revolution, and the magnet 130 may have p pole pairs. Note that for an ill-chosen reading radius the system might not work. For example, if the reading radius is so large that despite the eccentricity the sensor elements will always stay outside the center radius $R_{center}=\text{sqrt}(Ri*Ro)$ of the magnet ring. Or if the reading radius is so small that the sensors will always stay inside the center radius $R_{center}$ of the magnet ring.

Figure 7:
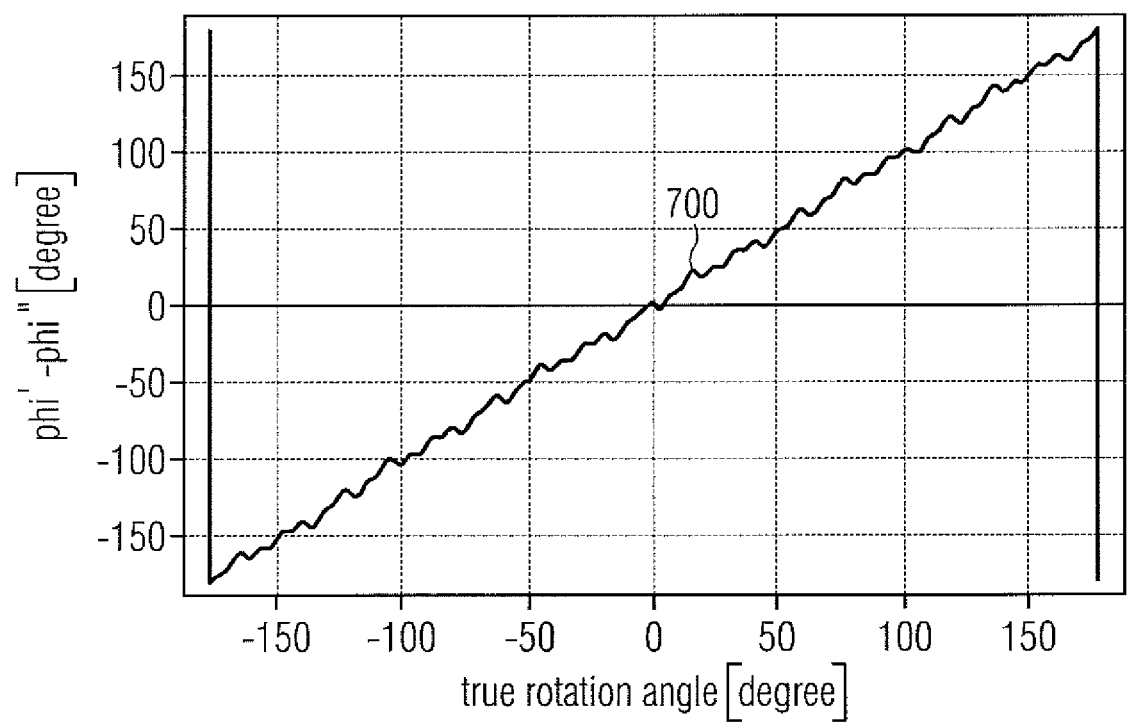
FIG. 7 shows a plot of an estimate of a rotation angle based on the first and second intermediate angular information phi' and phi"

If two angle readings phi' and phi" with p and p+1 periods per revolution are available, we can use known concepts to compute the rotation angle, such as known Nonius principles. In one example, the processing circuitry 150 can be configured to compute the difference of phi'−phi", which is illustrated in FIG. 7. The quality of curve 700 is not optimal because in this example the $B_R$-signals yield less accurate angle estimations than the $B_z$-signals. However, the magnetic angle sensor arrangement 100 needs this relationship only to have a rough estimation of the rotation angle. A finer estimation can be obtained from the $B_z$-signals, for example. Here it has to be borne in mind that the slope of the $B_z$-signals is p time higher than the average slope of curve 600. Let us assume that near −180° the plot 700 [phi'−phi"] returns a value, which is either near −180° or near +180°, however, the plot phi' obtained from the $B_z$-signals yields a negative reading for angles between −180° and −180°+360/11/2=−163.6°, whereas it gives a positive reading for angles between 164.6° and 180°.

Figure 8A:
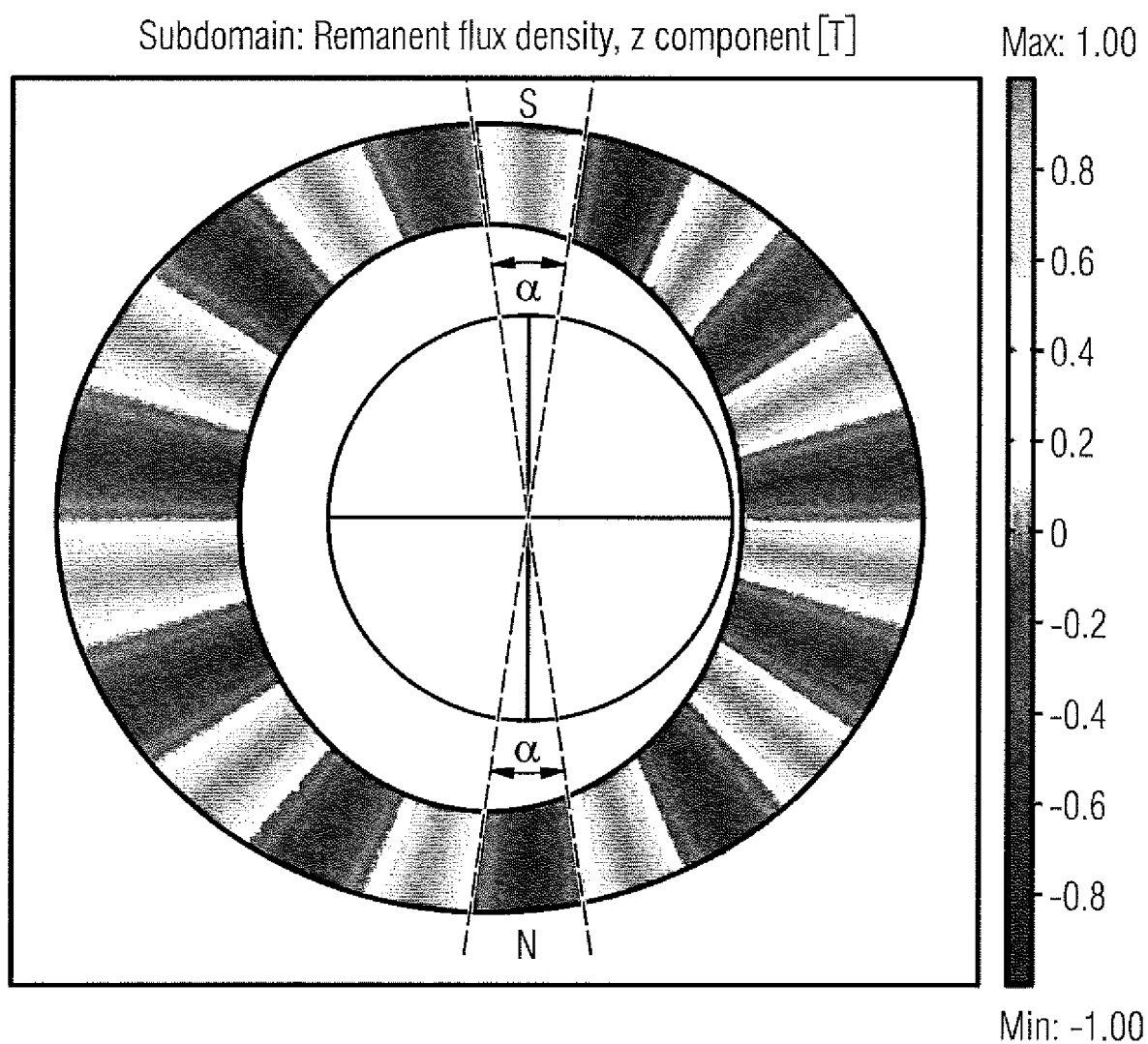
FIGS. 8A and 8B show different embodiments of a multipole magnet.
Figure 8B:
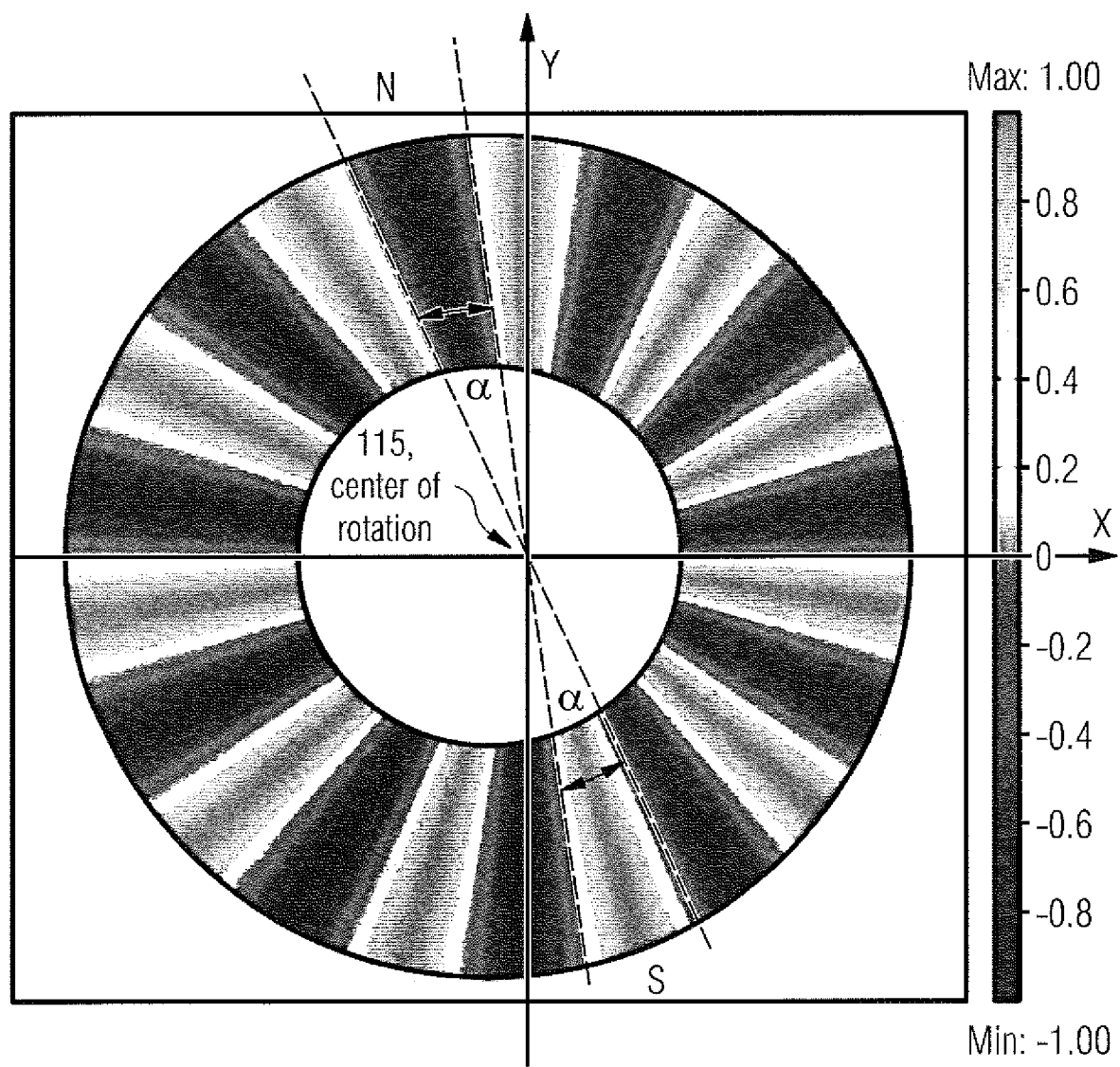
Figure 9:
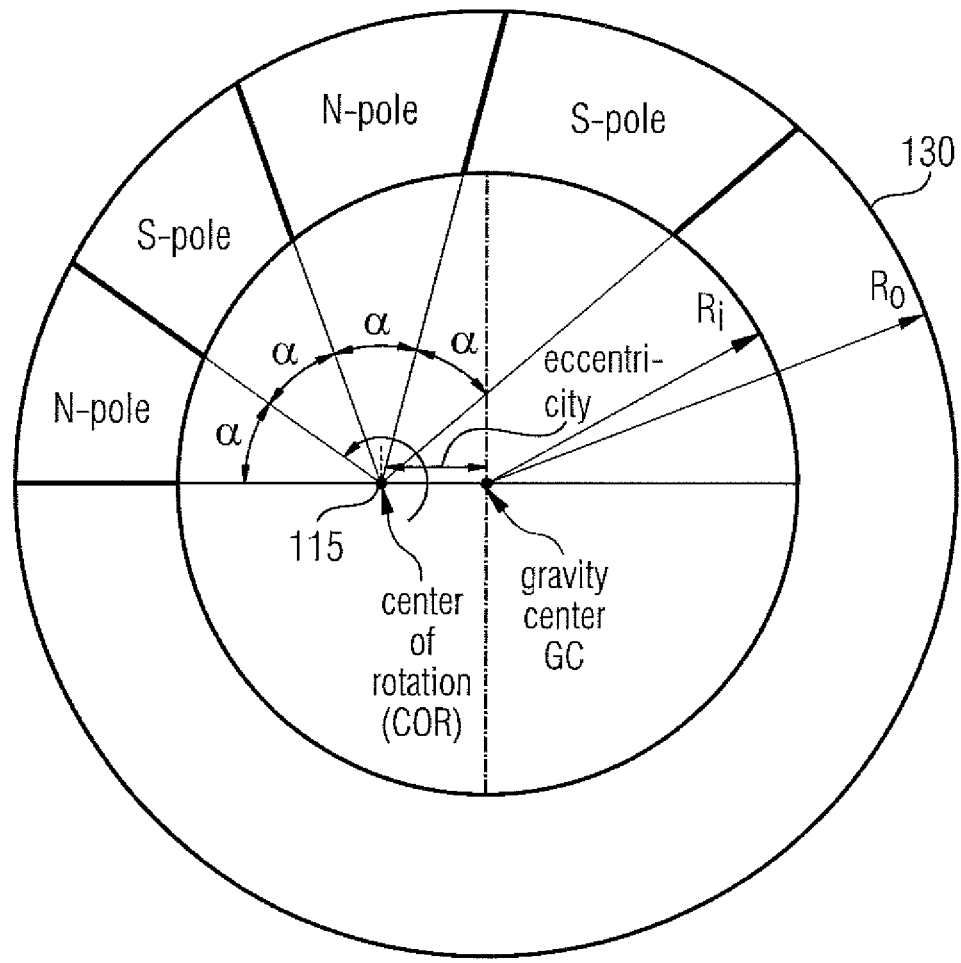
FIG. 9 illustrates a concept of a multipole magnet's magnetization center which is laterally shifted from the multipole magnet's center of gravity.

As mentioned above, the multipole-magnet 130 can be optimized in such a way as to avoid amplitude fluctuations of the intermediate signals Si, Co and Si', Co' over one revolution. For example, this can be done by choosing the symmetry center of the multipole magnet's magnetization somewhere between the center of rotation and the eccentricity. Examples where the symmetry center of the multipole magnet's 130 magnetization corresponds to the center of rotation are shown in FIGS. 8A and 8B. Also, the p pole pairs of the multipole-magnet 130 can have equal aperture angles α for each pole with respect to the center of rotation or the rotation axis 115. This concept is schematically illustrated in FIG. 9 showing an annular multipole magnet with p pole pairs and equal aperture angle α=360°/2p with respect to the rotation axis 115. It is noted, however, that this magnetization symmetry center offset is not mandatory and that the symmetry center of the multipole magnet's magnetization can also correspond to the symmetry center of the multipole magnet 130 physical/structural shape (gravity center). Although angle estimates may be more inaccurate, such multipole magnetic rings with corresponding magnetization symmetry centers and structural symmetry centers may be easier to manufacture and more versatile because they are independent of the final eccentricity.

Moreover, the radial width w of the multipole magnet ring 130 may vary versus azimuthal position (see FIG. 8A). For example, it may be larger for those parts of the ring, which are closer to the rotation axis, or for those which are farther away. Any one of the inner and outer perimeters of the magnet ring 130 may be circular or elliptical. If they are both elliptical, the major axes of these ellipses may be parallel or orthogonal. The latter may look like the example of FIG. 8A. Here, the center of the circle is the rotation axis 115 perpendicular to the drawing plane and the multipoles are the sequence of N- and S-poles and the centers of both ellipses are identical, but shifted to the left of the rotation axis.

If inner and outer perimeters are both circular, they do not need to have the same center, but may be shifted, e.g. by an amount comparable to the eccentricity. The magnet ring may be slim (i.e. w<<Ri) or wide like the one of FIG. 8B with concentric inner and outer circular perimeters, but where the symmetry center of the magnetic pattern is shifted to the right of the center of the circles.

It is also possible to use azimuthal (tangential) magnetic field components instead of axial ones.

The axial magnetic field component $B_z$ and the first intermediate signals Si, Co are little affected by external disturbance fields. The radial magnetic field components $B_r$ and the second intermediate signals Si', Co' can indeed be affected by external disturbance fields (namely diametrical ones). However, the system can be modified by replacing each $B_r$-field sensor by two $B_r$-field sensors, which may be tangentially distal by 1 . . . 5 mm. The processing circuitry can then compute dBr=Br(psi+dpsi)−Br(psi−dpsi) with dpsi*RR=1 . . . 5 mm (and RR being the reading radius of the sensor element). dBr is robust against external disturbance fields, particularly, if both sensor elements are not too close to the ferrous shaft 110. In further embodiments, also the other magnetic field components can be replaced by their differential analogons, i.e. instead of Bz the system can measure dBz=Bz(psi+dpsi)−Bz(psi−dpsi) and instead of Bpsi the system can measure dBpsi=Bpsi(psi+dpsi)−Bpsi (psi−dpsi). Whenever differential fields are to be measured two magnetic field sensitive elements are placed at azimuthal coordinate psi+dpsi and psi−dpsi and if they are sensitive to the same magnetic field component the circuit has to subtract their signals.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above processes, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A magnetic angle sensor arrangement, comprising:
   a multipole magnet rotatable around a rotation axis,
      wherein a geometric arrangement of the multipole magnet is rotationally asymmetric with respect to the rotation axis;
   a plurality of magnetic field sensor circuits placed around the rotation axis at predefined equidistant angular positions in a predefined axial distance from the multipole magnet,
      wherein each magnetic field sensor circuit, of the plurality of magnetic field sensor circuits, comprises a first magnetic field sensor element sensitive to a first magnetic field component and a second magnetic field sensor element sensitive to a second magnetic field component perpendicular to the first magnetic field component; and processing circuitry to:
compute a first intermediate angular information based on a combination of signals from a plurality of first magnetic field sensor elements,
compute a second intermediate angular information based on a combination of signals from a plurality of second magnetic field sensor elements, and
compute an estimate of a rotation angle of the multipole magnet based on the first intermediate angular information and the second intermediate angular information.

2. The magnetic angle sensor arrangement of claim 1, wherein a gravity center of the multipole magnet is radially displaced from the rotation axis.

3. The magnetic angle sensor arrangement of claim 1, wherein a gravity center of magnetized portions of the multipole magnet is displaced from the rotation axis with a radial displacement in a range between 1 mm and 5 mm.

4. The magnetic angle sensor arrangement of claim 1, wherein the multipole magnet is of annular shape and placed on a fixture eccentrically to the rotation axis.

5. The magnetic angle sensor arrangement of claim 1, wherein, when the multipole magnet is rotated around the rotation axis, a relative radial position between any one of the plurality of magnetic field sensor circuits and a perimeter of the multipole magnet varies during a revolution of the multipole magnet around the rotation axis.

6. The magnetic angle sensor arrangement of claim 5, wherein a first radial distance between a perimeter of the multipole magnet and one of the plurality of magnetic field sensor circuits at a first angular position of the multipole magnet differs from a second radial distance between the perimeter of the multipole magnet and the one of the plurality of magnetic field sensor circuits at a second angular position of the multipole magnet.

7. The magnetic angle sensor arrangement of claim 1, wherein the predefined axial distance is in a range from 1 mm to 3 mm.

8. The magnetic angle sensor arrangement of claim 1, wherein the multipole magnet comprises $p \geq 2$ pole pairs of equal aperture angle for each pole with respect to the rotation axis.

9. The magnetic angle sensor arrangement of claim 1, wherein the multipole magnet comprises $p \geq 2$ pole pairs, with $p \bmod N \neq 0$, and wherein the plurality of magnetic field sensor circuits are placed around the rotation axis with an angular spacing of $360°/N/p$ between adjacent ones of the plurality of magnetic field sensor circuits.

10. The magnetic angle sensor arrangement of claim 1, comprising $N=3$ of the plurality of magnetic field sensor circuits placed around the rotation axis at angular positions of 0°, 120°, and 240°, and wherein the processing circuitry is to compute the first intermediate angular information, phi', based on phi'=arctan(Co, Si),
wherein $Co = B_{z,0°} - (B_{z,120°} + B_{z,240°})/2$ and $Si = sqrt(3) * (B_{z,120°} - B_{z,240°})/2$, wherein $B_{z,0°}$ denotes an axial magnetic field component measured at 0°, $B_{z,120°}$ denotes an axial magnetic field component measured at 120°, and $B_{z,240°}$ denotes an axial magnetic field component measured at 240°.

11. The magnetic angle sensor arrangement of claim 1, wherein the processing circuitry is to compute the second intermediate angular information, phi", based on phi"=arctan(Co', Si'), wherein $Co' = B_{r,0°} - (B_{r,120°} + B_{r,240°})/2$ and $Si' = sqrt(3) * (B_{r,120°} - B_{r,240°})/2$, wherein $B_{r,0°}$ denotes a radial magnetic field component measured at 0°, $B_{r,120°}$ denotes a radial magnetic field component measured at 120°, and $B_{r,240°}$ denotes a radial magnetic field component measured at 240°.

12. A closed loop multipole magnet having a center of rotation which is offset from a gravity center of the closed loop multipole magnet,
wherein the closed loop multipole magnet comprises $p \geq 2$ pole pairs,
wherein each pole has a respective equal aperture angle $\alpha$ with respect to the center of rotation,
wherein $\alpha = 360°/2p$,
wherein an inner perimeter of the closed loop multipole magnet is elliptical, and
wherein an outer perimeter of the closed loop multipole magnet is a circle.

13. The closed loop multipole magnet of claim 12, wherein the closed loop multipole magnet is placed on a support carrier that is rotatable around a rotation axis, wherein the center of rotation coincides with the rotation axis and the gravity center is radially displaced from the rotation axis.

14. The closed loop multipole magnet of claim 13, wherein the closed loop multipole magnet is of annular shape and placed on the support carrier eccentrically to the rotation axis.

15. A method for estimating a rotation angle, the method comprising:
performing magnetic field measurements with a plurality of magnetic field sensor circuits arranged around a rotation axis at predefined angular positions in a predefined axial distance to a multipole magnet rotatable around the rotation axis, wherein each of the plurality of magnetic field sensor circuits comprises a first magnetic field sensor element sensitive to a first magnetic field component and a second magnetic field sensor element sensitive to a second magnetic field component perpendicular to the first magnetic field component;
varying a relative radial position between any one of a plurality of second magnetic field sensor elements and a perimeter of the multipole magnet by rotating the multipole magnet around the rotation axis;
computing a first intermediate angular information based on a combination of signals from a plurality of first magnetic field sensor elements;
computing a second intermediate angular information based on a combination of signals from the plurality of second magnetic field sensor elements; and
estimating the rotation angle based on the first intermediate angular information and the second intermediate angular information.

16. The method of claim 15, wherein varying the relative radial position comprises placing the multipole magnet on a support carrier rotating around the rotation axis, wherein a geometric arrangement of the multipole magnet on the support carrier is rotationally asymmetric with respect to the rotation axis.

17. The method of claim 16, wherein the support carrier is rotationally symmetric and arranged concentric to the rotation axis, wherein varying the relative radial position comprises placing the multipole magnet on the support carrier eccentrically to the rotation axis, wherein the multipole magnet has an annular shape.

18. The closed loop multipole magnet of claim 12, wherein a radial width of the closed loop multipole magnet varies with respect to azimuthal positions.

19. The closed loop multipole magnet of claim 12, wherein a symmetry center of a magnetization of the closed loop multipole magnet corresponds to the center of rotation.

20. The closed loop multipole magnet of claim 12, wherein a symmetry center of a magnetization of the closed loop multipole magnet corresponds to the gravity center.

* * * * *